United States Patent
Riddiford et al.

(10) Patent No.: US 7,499,785 B2
(45) Date of Patent: Mar. 3, 2009

(54) EXTENDED BRAKING COMPENSATION IN HYBRID BRAKING SYSTEMS

(75) Inventors: Bryan P. Riddiford, Dayton, OH (US); Michael C. Pfeil, South Charleston, OH (US); Richard J. Thomas, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 819 days.

(21) Appl. No.: 10/971,838

(22) Filed: Oct. 22, 2004

(65) Prior Publication Data

US 2006/0089777 A1    Apr. 27, 2006

(51) Int. Cl.
*B60T 8/32* (2006.01)

(52) U.S. Cl. .................... 701/70; 303/121; 303/155; 303/156; 303/152; 303/113.5; 701/96; 701/53; 340/467

(58) Field of Classification Search .................... 701/70; 303/121
See application file for complete search history.

(56) References Cited

U.S. PATENT DOCUMENTS

| | | | |
|---|---|---|---|
| 4,901,055 A * | 2/1990 | Rosenberg et al. ........ 340/467 |
| 5,620,240 A * | 4/1997 | Tuck et al. ................ 303/156 |
| 5,700,067 A * | 12/1997 | Heubner ..................... 303/9 |
| 5,731,977 A * | 3/1998 | Taniguchi et al. ........... 701/96 |
| 6,241,326 B1 * | 6/2001 | Ferguson et al. ........... 303/177 |
| 6,357,836 B1 * | 3/2002 | Schmitt et al. ........... 303/113.5 |
| 6,390,565 B2 * | 5/2002 | Riddiford et al. ........... 303/3 |
| 7,029,077 B2 * | 4/2006 | Anwar et al. .............. 303/152 |
| 2001/0016795 A1 * | 8/2001 | Bellinger .................... 701/53 |
| 2001/0035679 A1 * | 11/2001 | Riddiford et al. ........... 303/155 |
| 2002/0011366 A1 * | 1/2002 | Fuchs et al. ............... 180/167 |
| 2004/0239180 A1 * | 12/2004 | Foust ....................... 303/152 |
| 2006/0089777 A1 * | 4/2006 | Riddiford et al. ............ 701/70 |

* cited by examiner

*Primary Examiner*—Thomas G Black
*Assistant Examiner*—Wae Louie
(74) *Attorney, Agent, or Firm*—Thomas W. Twomey (57) ABSTRACT

A method for balancing brake force is disclosed. The method includes determining whether a deceleration value reaches a first deceleration threshold in response to a braking event and determining brake condition and vehicle motion. Based on brake condition and vehicle motion determination and the first deceleration threshold determination, the method determines whether the deceleration value reaches a second deceleration threshold, and applies threshold balancing when the second deceleration threshold is reached.

11 Claims, 10 Drawing Sheets

EXTENDED BRAKING COMPENSATION IN HYBRID BRAKING SYSTEMS

TECHNICAL FIELD OF THE INVENTION

The present invention relates generally to hybrid braking systems. More particularly, the invention relates to a brake-by-wire system.

BACKGROUND OF THE INVENTION

Hybrid braking systems include traditional hydraulic based brakes in addition to electric, brake-by-wire (BBW) brakes. The decoupling of the hydraulic and electric brakes allows electric brakes to apply normally even after the hydraulic brakes have faded. Application of the electric brakes includes a potential build-up of heat that may damage the brake calipers or drums. This heat build-up can be especially pronounced during an extended period of low braking levels, such as a mountain descent. During such an extended period, the brakes are deployed to control vehicle speed rather than to bring the vehicle to a stop.

BBW systems include a BBW electric actuator, such as a caliper or drum, including a mechanical unit that converts electrical energy to a rotor clamp force and an electric control unit (ECU) that controls the actuator. The mechanical and electrical units may or may not be in physical contact. In addition to the actuator, driver input sensors supply a signal indicating driver commands to the system—a pedal force sensor, a master cylinder pressure sensor and a pedal travel sensor.

Historically, the primary braking force control at low deceleration levels in a BBW system is pedal displacement based on the pedal travel sensor. For example, one function for calculating the command force function is:

$F_{cmd} = X_{pedal} * f_{pedal}(P) + P_{pressure} * f_{pressure}(P)$, where f is a weighting function, $x_{pedal}$ is the pedal travel signal and $P_{pressure}$ is the master cylinder pressure signal.

Use of pedal displacement as the control signal provides a robust signal with good bandwidth characteristics. Use of schemes of this type provide good pedal feel for the inherent system compliance, as pedal travel has been effectively used in full BBW systems to produce acceptable performance under all braking conditions. However, pedal displacement varies with vehicle build, use and age. Thus, in a hybrid system, the brake balance between front and rear can change due to changes in the pedal force (i.e. master cylinder pressure) to travel signal relationship. These changes may adversely affect front/rear brake balance. In an attempt to correct the front/rear brake balance, some systems utilize wheel speed data during braking events to maintain front/rear brake balance, in a process referred to as Dynamic Rear Proportioning (DRP).

Figure 1:
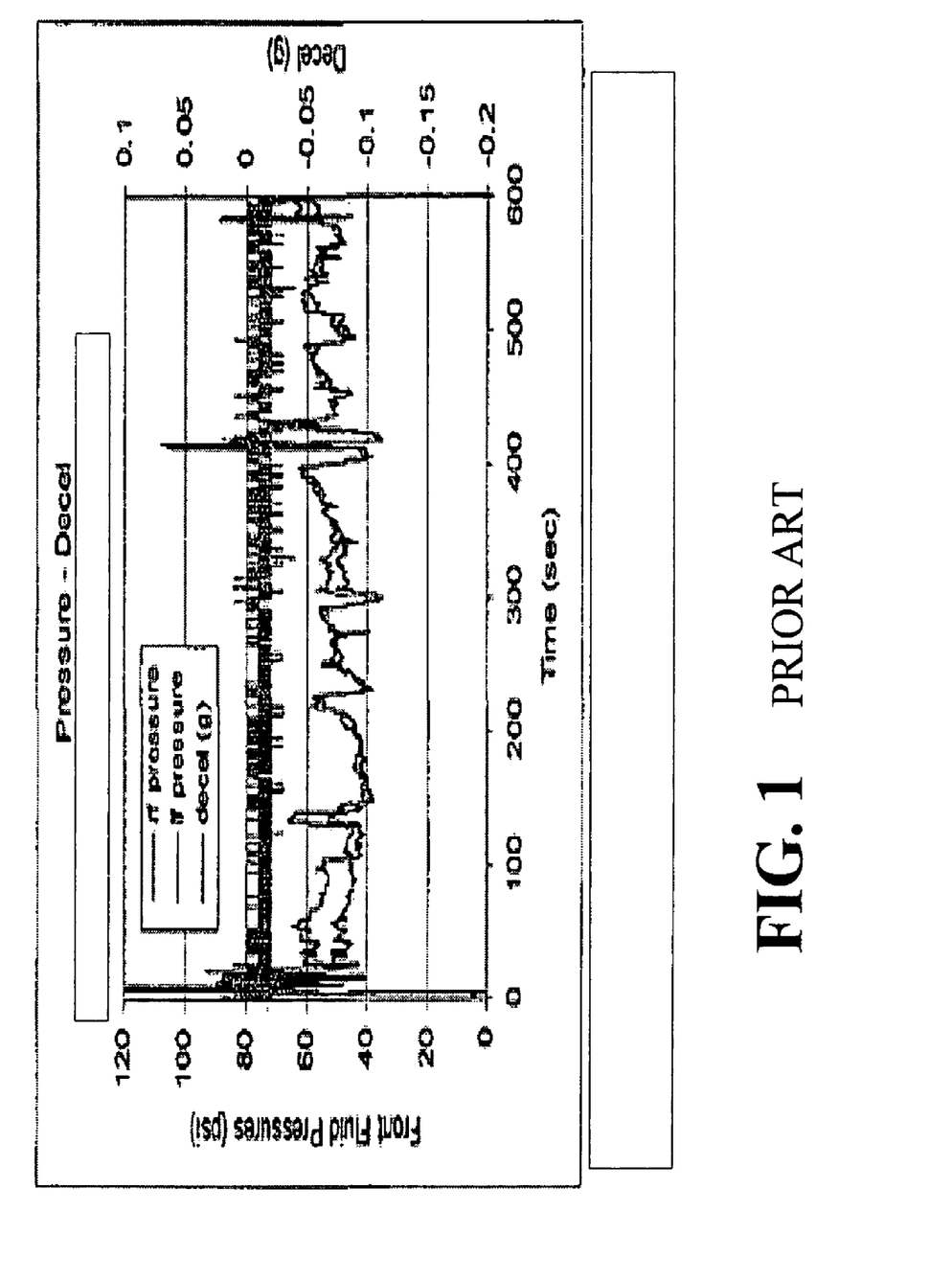
FIG. 1 is an illustration of the effects of prior art braking balancing effects.
Figure 2:
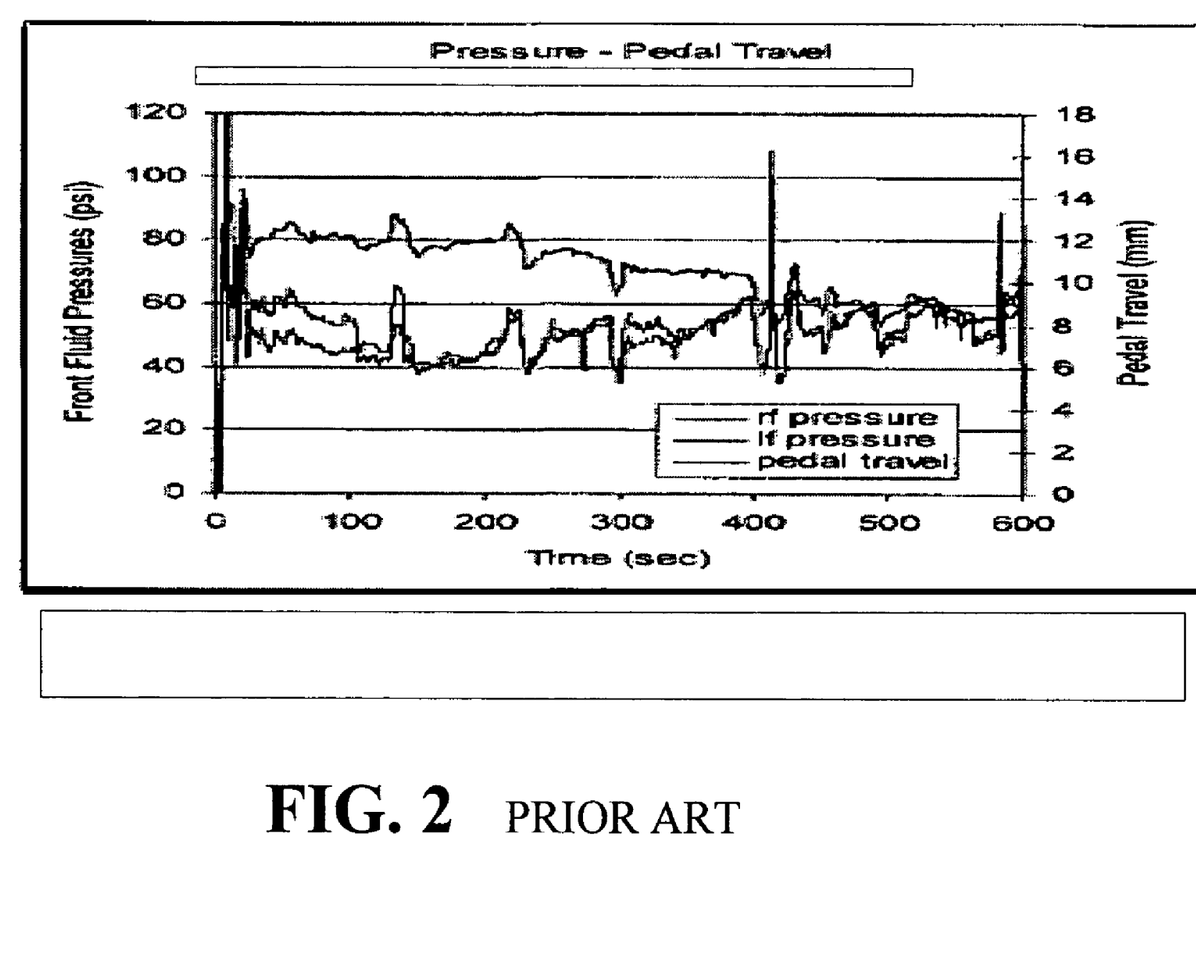
FIG. 2 is an illustration of the effects of prior art braking balancing effects.
Figure 3:
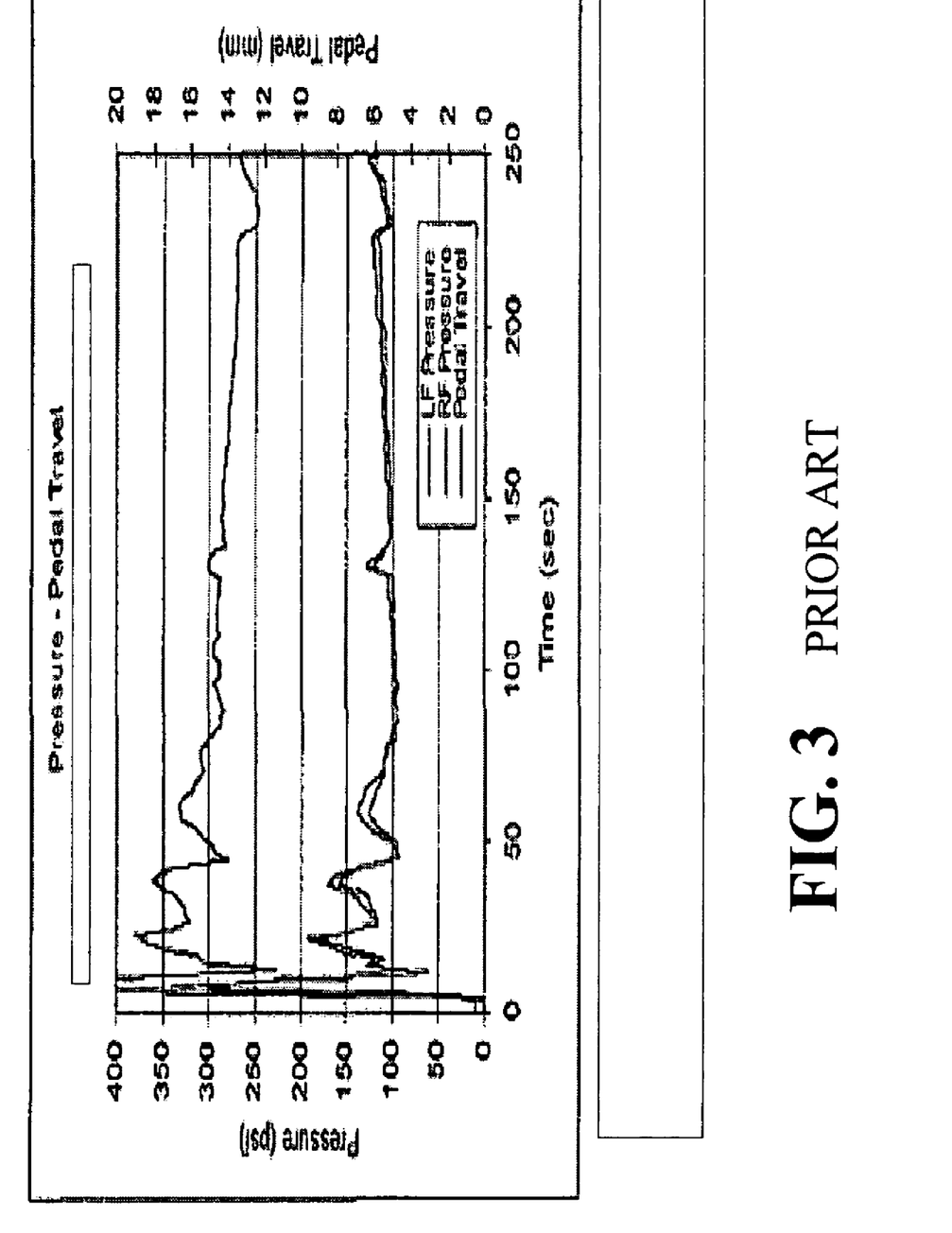
FIG. 3 is an illustration of the effects of prior art braking balancing effects.

However, measurements of hybrid brake system vehicle deceleration level and fluid pressure in both front calipers, during an extended braking event, reveal variation in relationship between pedal displacement and master cylinder pressure. FIGS. 1, 2 and 3 illustrate this relationship, and illustrate that after the first 100 seconds of the braking event the relationship between pedal travel and master cylinder pressure changes. This change illustrates that the relative magnitude and rate of change are system dependent and may have considerable variation.

FIG. 3 illustrates similar behavior, but with higher torque levels, simulating an increased downhill grade during the braking event or increased vehicle mass. As shown, the pressure increase as the driver compensates for reduced rear braking resulting from pedal travel affecting the rear actuator.

Figure 4:
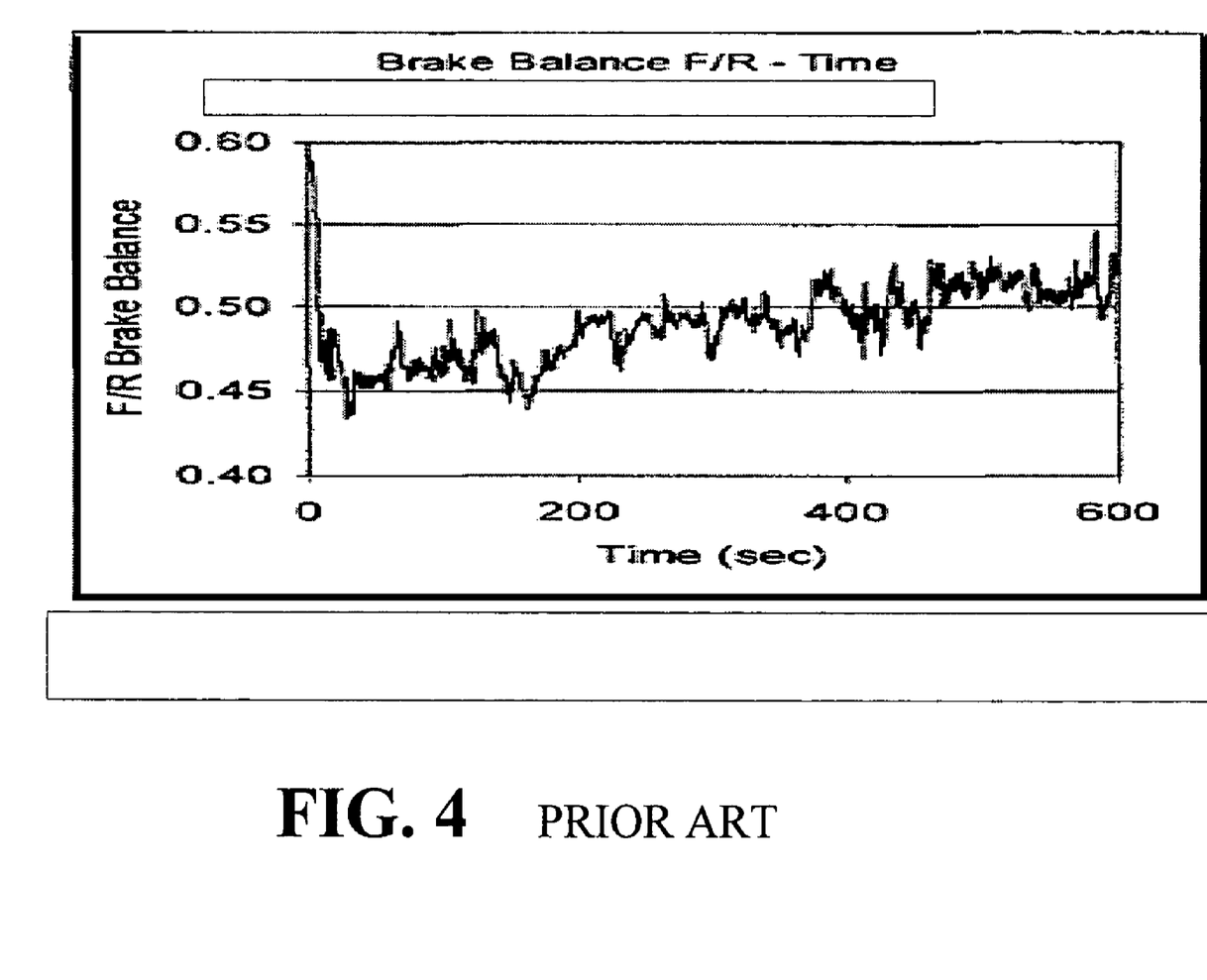
FIG. 4 is an illustration of the effects of prior art braking balancing effects.

In an extended braking situation, reliance on wheel speed can lead to excessive heat build up in the rear actuator. In contrast to transient events, for example, parking lot maneuvers, utilizing pedal travel while at low speeds as the dominant input produces an undesirable shift in brake balance, as the signal resolution for DRP is limited. FIG. 4 illustrates increasing front bias. However, a greater concern is rear bias, as in such a situation, the rear actuator would produce more torque under the same deceleration condition—increasing the heat load on the electric systems of the rear brakes and potentially causing undesirable performance of the rear brakes.

Therefore, it would be desirable to provide a method of balancing front and rear brake forces in a hybrid brake system that overcomes the aforementioned and other disadvantages.

SUMMARY OF THE INVENTION

One aspect of the invention provides a method for balancing brake force. The method includes determining whether a deceleration value reaches a first deceleration threshold in response to a braking event and determining brake condition and vehicle motion. The method further determines whether the deceleration value reaches a second deceleration threshold based on the brake condition and vehicle motion determination and the first deceleration threshold determination and applies threshold balancing when the second deceleration threshold is reached.

Another aspect of the invention provides a computer readable medium comprising computer readable code for balancing brake force including computer readable code for determining whether a deceleration value reaches a first deceleration threshold in response to a braking event. The medium further includes computer readable code for determining brake condition and vehicle motion and computer readable code for determining whether the deceleration value reaches a second deceleration threshold based on the brake condition and vehicle motion determination and the first deceleration threshold determination. In addition, the medium includes computer readable code for applying threshold balancing when the second deceleration threshold is reached.

Another aspect of the invention includes a system for balancing brake force including means for determining whether a deceleration value reaches a first deceleration threshold in response to a braking event. The system further includes means for determining brake condition and vehicle motion and means for determining whether the deceleration value reaches a second deceleration threshold based on the brake condition and vehicle motion determination and the first deceleration threshold determination. In addition, the system includes means for applying threshold balancing when the second deceleration threshold is reached.

The foregoing and other features and advantages of the invention will become further apparent from the following description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE INVENTION

Figure 5:
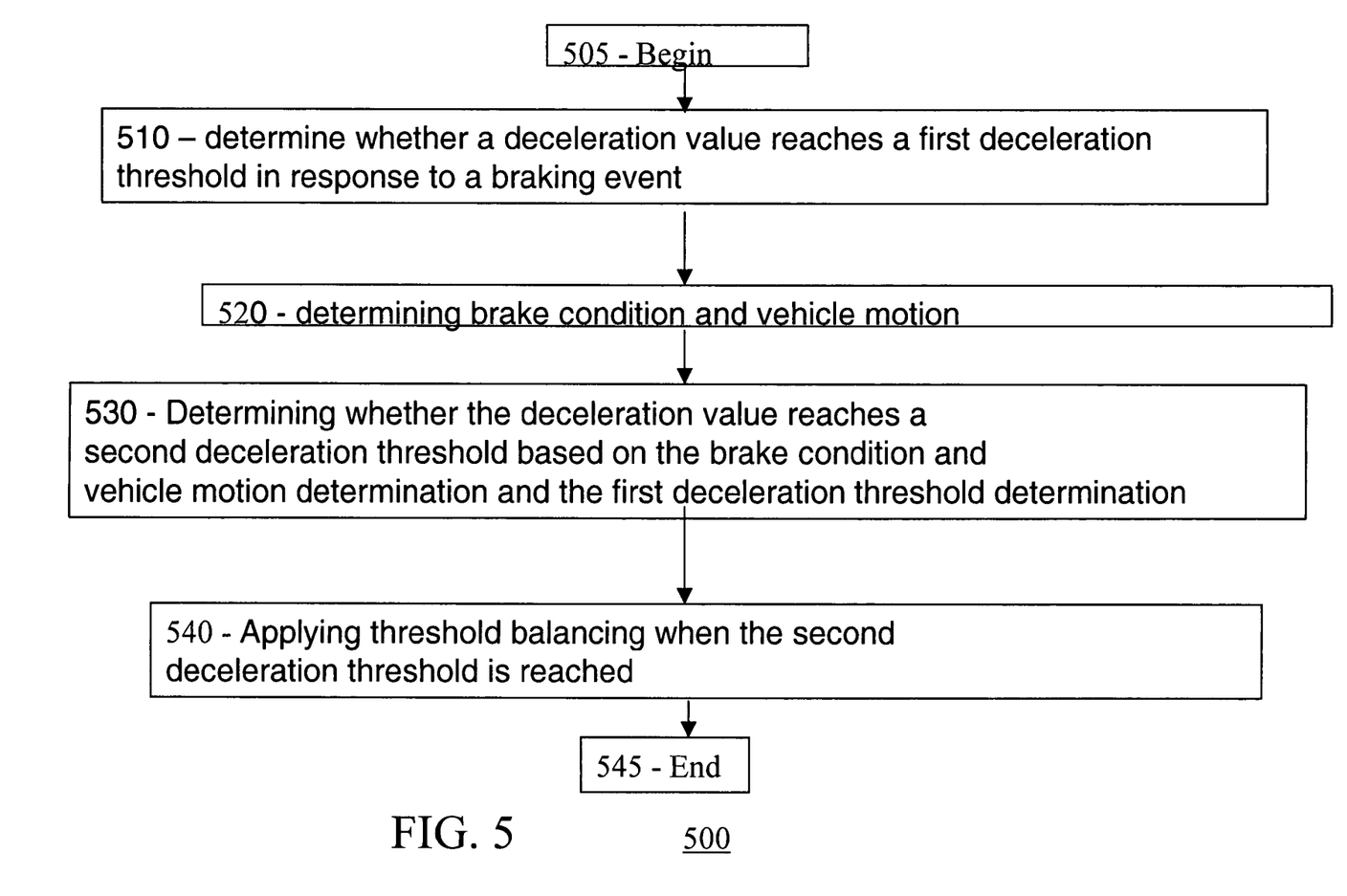
FIG. 5 is a flowchart depicting one embodiment of a method for balancing braking in accordance with one aspect of the invention.

FIG. 5 illustrates a flowchart of a method 500 for balancing brake force, in accordance with one aspect of the invention. Method 500 begins at step 505.

Method 500 determines whether a deceleration value reaches a first deceleration threshold in response to a braking event at step 510. A braking event is any occurrence wherein the brakes are to be applied. For example, a braking event begins with the application of force to a brake pedal in a motor vehicle. A deceleration value is determined by obtaining vehicle speed data from the vehicle, for example, by determining wheel speed or by other methods as known to those of skill in the art. In one embodiment, the deceleration value is filtered prior to further calculations. A first deceleration threshold is a predetermined constant that indicates the rate of deceleration experienced by the vehicle. In one embodiment, the first deceleration threshold indicates a low rate of deceleration. A low rate of deceleration, for example, indicates that the vehicle is not coming to a rapid stop. In one embodiment, the first deceleration threshold is approximately 0.15 g. In one embodiment, the first deceleration threshold is between approximately 0.1 g and approximately 0.18 g. The method determines whether the deceleration value reaches or exceeds the first deceleration threshold by comparing the deceleration value and the first deceleration threshold.

After determining that the deceleration value meets or exceeds the first deceleration threshold, method 500 determines the brake condition and vehicle motion at step 520. Brake condition determines whether the brakes are applied and vehicle motion determines whether the vehicle is in motion. Determining whether the brakes are applied, in one embodiment, includes obtaining a pedal travel value, or a pedal displacement value. Determining whether the vehicle is in motion, in one embodiment, includes obtaining data from wheel sensors, gyroscopes, or any other method known to those of ordinary skill in the art. In another embodiment, the determination whether the deceleration value meets or exceeds the first deceleration threshold includes determining a time span since application of the brakes, termed a lapse time. Lapse time is a predetermined constant, determined based on vehicle characteristics, such as vehicle model. A vehicle designer or a designer of a brake system for a particular model vehicle calculates the predetermined constant, for example.

After determining that the brakes are applied and the vehicle is in motion, method 500 determines whether the deceleration value meets or exceeds a second deceleration threshold at step 530. A second deceleration threshold is a predetermined constant reflecting a very low rate of deceleration. The determination of whether the deceleration value reaches or exceeds a second deceleration threshold is based on the brake condition and vehicle motion determination, as well as the determination of the deceleration value reaching or exceeding the first deceleration threshold. In the event that the deceleration value reaches the second deceleration threshold, the vehicle is said to be in an extended braking state and in low deceleration. In one embodiment, the second deceleration threshold is approximately 0.05 g. In one embodiment, the second deceleration threshold is between 0.03 g and 0.08 g.

Based on reaching the second deceleration threshold, threshold balancing is applied at step 540. Threshold balancing is applied to balance braking force between front and rear brakes in response to a low rate of deceleration. Threshold balancing is applied in response to a weighting factor dynamically determined between master cylinder pressure and pedal travel and is not determined based on wheel speed. In one embodiment, applying threshold balancing comprises determining a front brake force and a rear brake force in response to the extended braking state and low deceleration, wherein the rear brake force is calculated using a weighted sum of the pedal displacement and master cylinder pressure and the front brake force is calculated using master cylinder pressure.

In one embodiment, applying threshold balancing, the rear brake force is calculated according to the formula $F_{cmd} = w \cdot K_{pressure\_gain} \cdot P + (1-w) \cdot N$, wherein $F_{cmd}$ represents the rear brake force, $K_{pressure\_gain}$ represents a predetermined constant representing a desired front/rear brake balance, P represents master cylinder pressure, N represents the normal brake force and w is a dynamically determined weighting factor such that $0 \leq w \leq 1$. In one embodiment, $K_{pressure\_gain}$ is set at approximately 10 N/psi. In one embodiment, $K_{pressure\_gain}$ is between approximately 8 N/psi and 12 N/psi.

In one embodiment, for example, when the deceleration value reaches the second deceleration threshold, w is calculated according to the formula $w(k) = MIN\{k_{w\_max}, w(k-1) + k_{enter\_gain}\}$, and wherein $k_{w\_max}$ is a predetermined constant such that $0 \leq k_{w\_max} \leq 1$ and $k_{enter\_gain}$ is a predetermined constant to determine the transition rate. In one embodiment, $k_{enter\_gain}$ is approximately 0.001. In one embodiment, $k_{enter\_gain}$ is between 0.0005 and 0.002. $w(k-1)$ is the value of w calculated during the immediately previous iteration of the method.

In another embodiment, for example, when the deceleration value does not meet or exceed the first deceleration threshold, w is calculated according to the formula $w(k) = MAX\{0, w(k-1) - k_{exit\_hi\_gain\_decel}^2 + k_{exit\_hi\_offset}\}$, and wherein $k_{exit\_hi\_gain\_decel}$ and $k_{exit\_hi\_offset}$ are predetermined constants configured to control the exit rate relative to the enter rate. In one embodiment, $k_{exit\_hi\_offset}$ is approximately 0.000625. In one embodiment, $k_{exit\_hi\_offset}$ is between 0.0005 and 0.0007. As used herein, the terms "enter rate" and "exit rate" refer to the speed that threshold balancing is entered, and exited, respectively.

In another embodiment, for example, when the deceleration value meets or exceeds the first deceleration value and the vehicle is in motion while the brakes are applied, w is calculated according to the formula $w(k)=\text{MAX}\{0, w(k-1)-k_{exit\_off\_gain}\}$, wherein $k_{exit\_off\_gain}$ is a predetermined constant. In one embodiment, $k_{exit\_off\_gain}$ is 0.0005. In one embodiment, $k_{exit\_off\_gain}$ is less than $k_{enter\_gain}$. In one embodiment $k_{exit\_off\_gain}$ is $0.5 * k_{enter\_gain}$.

Method 500 ends at step 545.

Figure 6:
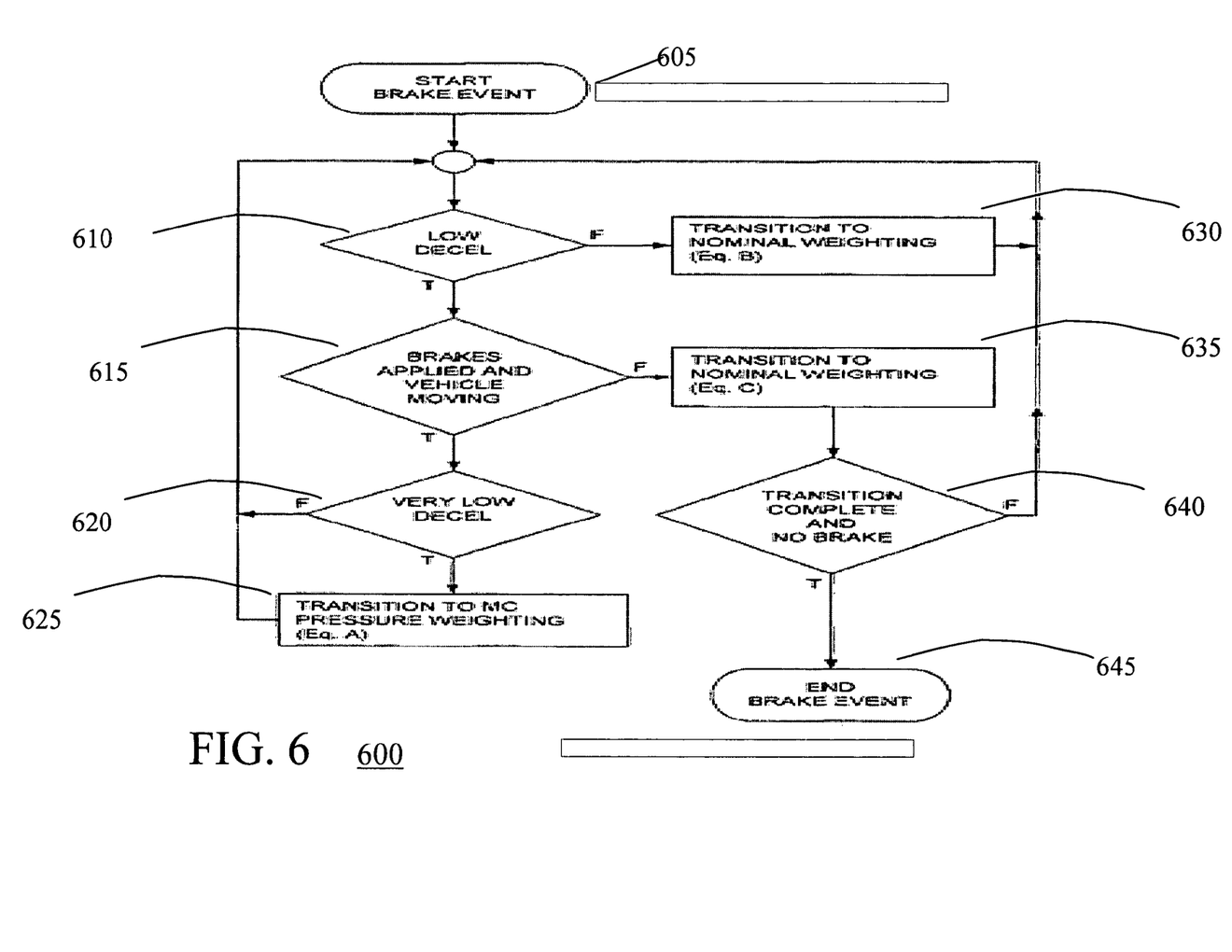
FIG. 6 is a flowchart depicting one embodiment of a method for balancing braking in accordance with one aspect of the invention.

Method 600 illustrates another embodiment of a method to balance braking forces in accordance with the invention in FIG. 6. Method 600 begins at step 605 when a brake event begins, as in step 510.

Method 600 determines whether the vehicle is in a low deceleration state at step 610. A low deceleration state exists when a deceleration value reaches or exceeds a first deceleration threshold. In the event that the first deceleration threshold is not reached or exceeded, method 600 proceeds to step 630 and normal brake weighting is applied. In one embodiment, normal brake weighting comprises calculating brake forces to be applied using the formula: $w(k)=\text{MAX}\{0, w(k-1)-k_{exit\_hi\_gain\_decel}^2 + k_{exit\_hi\_offset}\}$. After applying normal brake forces, method 600 returns to step 610. Similarly named mathematical operators in method 600 have the same meaning as described in method 500, and the same examples are applicable. In another embodiment, the determination whether the vehicle is in a state of extended deceleration includes determining a time span since application of the brakes, termed a lapse time. Lapse time is a predetermined constant, determined based on vehicle characteristics, such as vehicle model. A vehicle designer or a designer of a brake system for a particular model vehicle calculates the predetermined constant, for example.

If the step 610 determination of the low deceleration state indicates that the deceleration value meets or exceeds the first deceleration threshold, method 600 determines whether the vehicle is in motion and the brakes applied, in step 615. Determining vehicle motion may comprise obtaining wheel speed data. Determining whether the brakes are applied may comprise obtaining pedal travel information. In the event that the brakes are not applied or the vehicle is not moving, normal braking is applied at step 635. Normal braking at step 635, in one embodiment, includes calculating brake forces to be applied using the formula: $w(k)=\text{MAX}\{0, w(k-1)-k_{exit\_off\_gain}\}$. After applying normal brake forces, method 600 determines whether the transition is complete and there is no longer a brake force applied at step 640. If the transition is not complete, method 600 returns to step 610. If the transition is complete, method 600 ends at step 645.

Returning to step 615, in the event that the brakes are applied and the vehicle is moving, method 600 determines whether the deceleration value meets or exceeds a second deceleration threshold at step 620. In the event that the deceleration value meets or exceeds the second deceleration threshold, the vehicle is said to be in a state of very low deceleration. If the deceleration value does not meet or exceed the second deceleration threshold, method 600 returns to step 610. If the deceleration value does exceed the second deceleration threshold, however, method 600 continues to step 625, and balances the brake force, using threshold balancing. In one embodiment, threshold balancing includes calculating brake forces to be applied using the formula $F_{cmd}=w*K_{pressure\_gain}*P+(1-w)*N$. Method 600 then continues to step 610.

The methods disclosed herein are to be iterated at a predetermined frequency, and the predetermined constants are to be tuned to achieve desired performance. For example, the selection of constants may be used to control the transition rate between application of threshold balancing and normal braking. In another example, the selection of constants may be used to control the rate at which threshold balancing applies. The constants may be determined and preset by a manufacturer or may be user configurable. In one embodiment, the methods iterate at 100 Hz.

Figure 7:
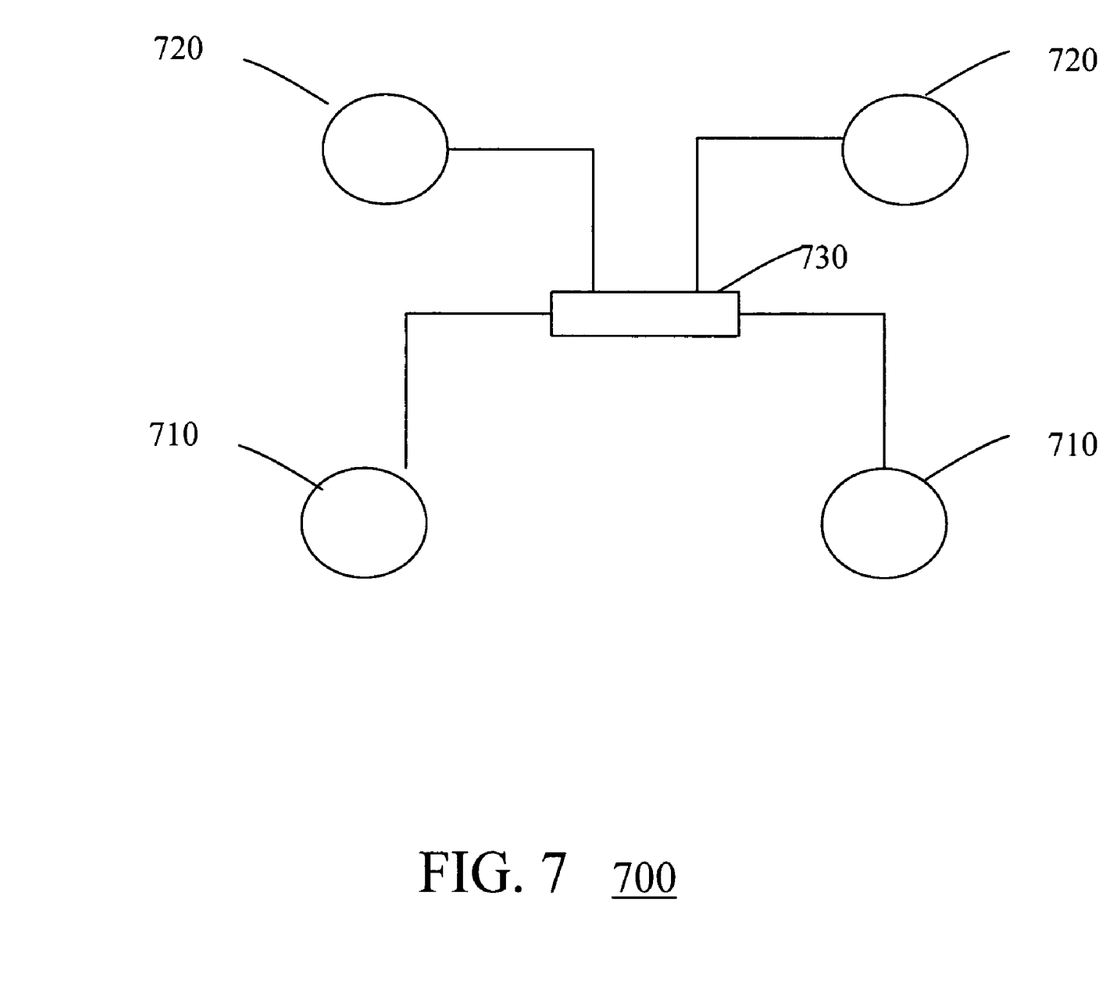
FIG. 7 is a schematic diagram showing one embodiment of a system in accordance with one aspect of the invention.

FIG. 7 is a schematic diagram illustrating a system 700 for executing the methods described herein. System 700 includes front brakes 710, rear brakes 720 and electronic control unit 730. Front brakes and rear brakes 710, 720 are implemented as a hybrid BBW system, as known by those of skill in the art such that front brakes 710 are hydraulically activated, and rear brakes 720 are electronic brakes. Electronic control unit 730 is a device configured to execute the method steps described above with reference to FIG. 5 and FIG. 6 and calculate the brake forces to be applied to the front and rear brakes. In one embodiment, electronic control unit 730 includes a computer readable medium including computer readable code to accomplish the method steps described above with reference to FIG. 5 and FIG. 6.

Figure 8:
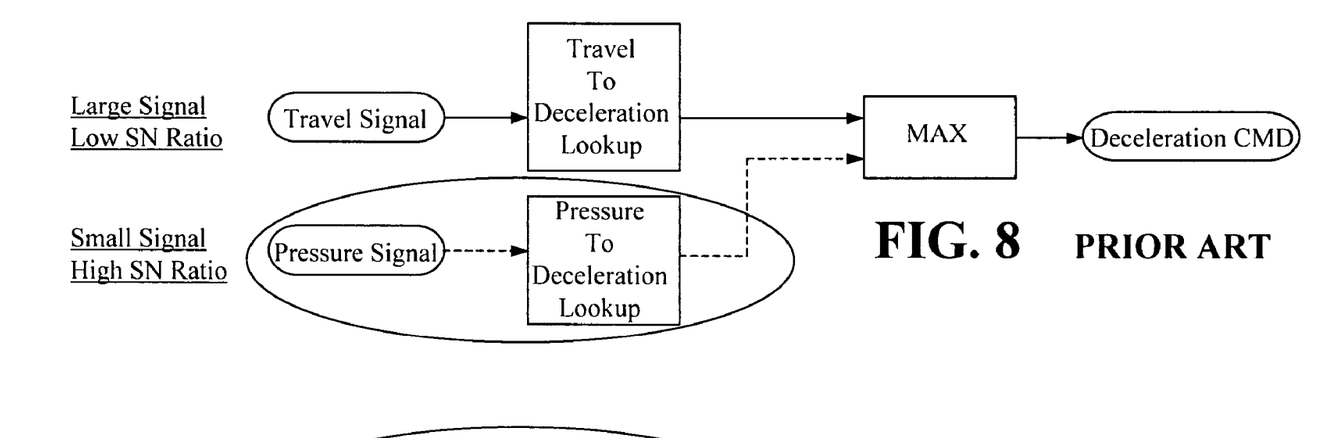
FIG. 8 is a flowchart depicting one embodiment of a prior method for balancing braking.

FIG. 8 is a flowchart depicting one embodiment of a prior method 800 for balancing braking during low deceleration. During low deceleration, the pressure signal has limited effect on the deceleration command due to the low signal level. In method 800, a travel signal is utilized when the signal is large with a low signal/noise ratio. Based on the travel signal, a travel to deceleration lookup table is consulted. Conversely, when the travel signal is small with a high signal/noise ratio, a pressure signal is used to consult a pressure to deceleration lookup table. A maximum brake pressure is determined based on the lookup table results and the deceleration command is issued based on the maximum brake pressure.

Figure 9:
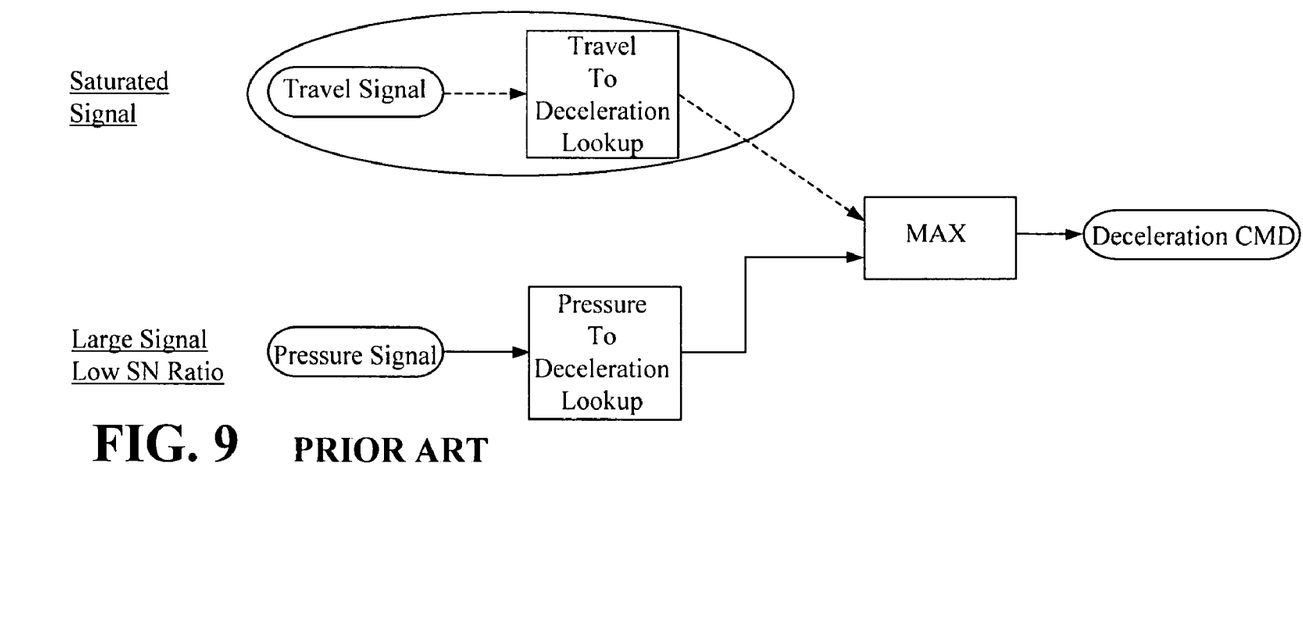
FIG. 9 is a flowchart depicting one embodiment of a prior method for balancing braking.

FIG. 9 is a flowchart depicting one embodiment of a prior method 900 for balancing braking during high deceleration. During high deceleration, the travel signal becomes saturated and has limited effect on the deceleration command. During method 900, a travel signal is used to consult a travel to deceleration lookup table and a pressure signal is used to consult a pressure to deceleration lookup table. The travel signal is saturated, while the pressure signal is a large signal with a low signal/noise ratio. A maximum brake command is determined based on the lookup table results and a deceleration command is determined based on the maximum brake command.

Figure 10:
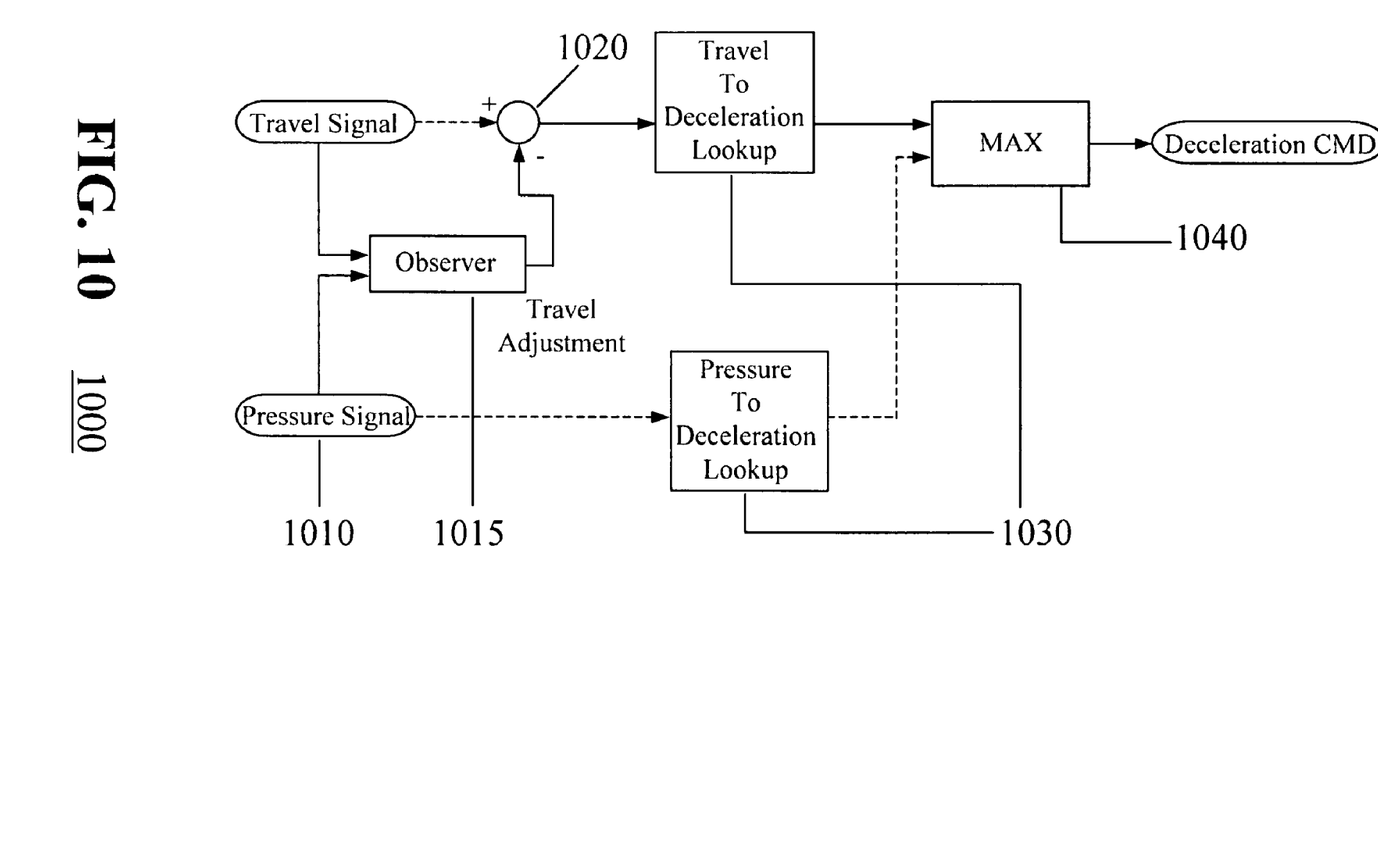
FIG. 10 is a flowchart depicting one embodiment of a method for balancing braking in accordance with one embodiment of the present invention.

FIG. 10 is a flowchart depicting one embodiment of a method 1000 for balancing braking in accordance with one embodiment of the present invention. Method 1000 begins by determining a travel signal and pressure signal at step 1010. The travel signal and pressure signal are sent to an observer at step 1015 and the observer makes a travel adjustment to create a travel-adjusted signal at step 1020. The travel-adjusted signal is used to consult a travel to deceleration lookup table at step 1030, while the pressure signal is used to consult a pressure to deceleration lookup table. At step 1040, the maximum of the results of the travel to deceleration lookup table and pressure to deceleration lookup table is used to determine the deceleration command.

Figure 11:
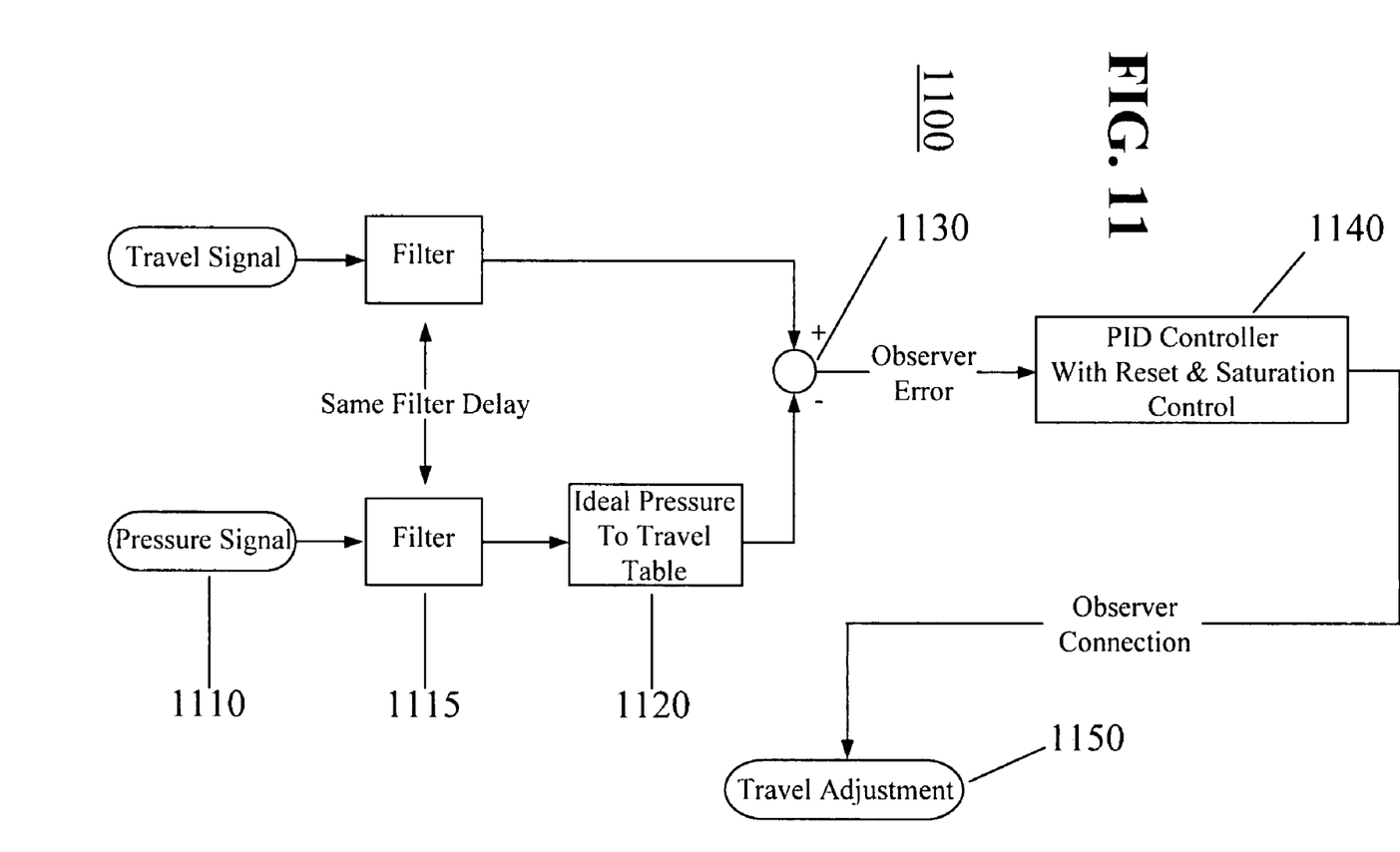
FIG. 11 is a flowchart depicting one embodiment of a method for balancing braking in accordance with one embodiment of the present invention.

FIG. 11 is a flowchart depicting one embodiment of a method 1100 for balancing braking in accordance with one embodiment of the present invention. Method 1100 begins by determining a travel signal and pressure signal at step 1110. The travel signal and pressure signal are filtered at step 1115. In one embodiment, the same filter delay is applied to the travel signal and pressure signal.

The filtered pressure signal is used to consult an ideal pressure to travel lookup table at step 1120. The results from the pressure to travel lookup table and the filtered travel signal are operated on to adjust for observer error, creating an adjusted filtered signal at step 1130. The adjusted filter signal is operated upon by a PID controller with reset and saturation control at step 1140 to correct for the observer correction, and the travel adjustment is calculated at step 1150.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method for balancing brake force, the method comprising:
    determining an extended braking state including whether a deceleration value reaches a first deceleration threshold in response to a braking event;
    determining brake condition and vehicle motion;
    determining whether the deceleration value reaches a second deceleration threshold based on the brake condition and vehicle motion determination and the first deceleration threshold determination; and
    applying threshold balancing when the second deceleration threshold is reached;
    wherein applying threshold balancing comprises: determining a front brake force and a rear brake force in response to the extended braking state and low deceleration, wherein the rear brake force is calculated using a weighted sum of the pedal displacement and master cylinder pressure and the front brake force is calculated using master cylinder pressure.

2. A method for balancing brake force, the method comprising:
    determining an extended braking state including whether a deceleration value reaches a first deceleration threshold in response to a braking event:
    determining brake condition and vehicle motion;
    determining whether the deceleration value reaches a second deceleration threshold based on the brake condition and vehicle motion determination and the first deceleration threshold determination; and
    applying threshold balancing when the second deceleration threshold is reached;
    wherein applying threshold balancing comprises: determining a front brake force and a rear brake force in response to the extended braking state and low deceleration, wherein the rear brake force is calculated using a weighted sum of the pedal displacement and master cylinder pressure and the front brake force is calculated using master cylinder pressure,
    wherein the rear brake force is calculated according to the formula $F_{cmd} = w*K_{pressure\_gain}*P + (1-w)*N$, wherein $F_{cmd}$ represents the rear brake force, $K_{pressure\_gain}$ represents a predetermined constant, P represents master cylinder pressure, N represents the normal brake force and w is a dynamically determined weighting factor such that $0 \leq w \leq 1$.

3. The method of claim 2 wherein w is calculated according to the formula $w(k) = MIN\{k_{w\_max}, w(k-1) + k_{enter\_gain}\}$, and wherein $k_{w\_max}$ is a predetermined constant such that $0 \leq k_{w\_max} \leq 1$ and $k_{enter\_gain}$ is a predetermined constant.

4. The method of claim 2 wherein w is calculated according to the formula $w(k) = MAX\{0, w(k-1) - k_{exit\_hi\_gain\_decel}^2 + k_{exit\_hi\_offset}\}$, and wherein $k_{exit\_hi\_gain\_decel}$ and $k_{exit\_hi\_offset}$ are predetermined constants.

5. The method of claim 2 wherein w is calculated according to the formula $w(k) = MAX\{0, w(k-1) - k_{exit\_off\_gain}\}$, and wherein $k_{exit\_off\_gain}$ is a predetermined constant.

6. A computer readable medium comprising computer readable code for balancing brake force including:
    computer readable code for determining whether a deceleration value reaches a first deceleration threshold in response to a braking event;
    computer readable code for determining brake condition and vehicle motion;
    computer readable code for determining whether the deceleration value reaches a second deceleration threshold based on the brake condition and vehicle motion determination and the first deceleration threshold determination; and
    computer readable code for applying threshold balancing when the second deceleration threshold is reached;
    wherein computer readable code for applying threshold balancing comprises computer readable code for determining a front brake force and a rear brake force in response to the extended braking state and low deceleration, wherein the rear brake force is calculated using a weighted sum of the pedal displacement and master cylinder pressure, and the front brake force is calculated using master cylinder pressure.

7. A computer readable medium comprising computer readable code for balancing brake force including:
    computer readable code for determining whether a deceleration value reaches a first deceleration threshold in response to a braking event;
    computer readable code for determining brake condition and vehicle motion;
    computer readable code for determining whether the deceleration value reaches a second deceleration threshold based on the brake condition and vehicle motion determination and the first deceleration threshold determination; and
    computer readable code for applying threshold balancing when the second deceleration threshold is reached;
    wherein computer readable code for applying threshold balancing comprises computer readable code for determining a front brake force and a rear brake force in response to the extended braking state and low deceleration, wherein the rear brake force is calculated using a weighted sum of the pedal displacement and master cylinder pressure and the front brake force is calculated using master cylinder pressure; and
    wherein the rear brake force is calculated according to the formula $F_{cmd} = w*K_{pressure\_gain}*P + (1-w)*N$, wherein $F_{cmd}$ represents the rear brake force, $K_{pressure\_gain}$ represents a predetermined constant, P represents master cylinder pressure, N represents the normal brake force and w is a dynamically determined weighting factor such that $0 <= w <= 1$.

8. The medium of claim 7 wherein w is calculated according to the formula $w(k) = MIN\{k_{w\_max}, w(k-1) + k_{enter\_gain}\}$, and wherein $k_{w\_max}$ is a predetermined constant such that $0 <= k_{w\_max} <= 1$ and $k_{enter\_gain}$ is a predetermined constant.

9. The medium of claim 7 wherein w is calculated according to the formula $w(k) = MAX\{0, w(k-1) - k_{exit\_hi\_gain\_decel}^2 + k_{exit\_hi\_offset}\}$, and wherein $k_{exit\_hi\_gain\_decel}$ and $k_{exit\_hi\_offset}$ are predetermined constants.

10. The medium of claim 7 wherein w is calculated according to the formula $w(k)=MAX\{0, w(k-1)-k_{exit\_off\_gain}\}$, and wherein $k_{exit\_off\_gain}$ is a predetermined constant.

11. A system for balancing brake force, the method comprising:

means for determining whether a deceleration value reaches a first deceleration threshold in response to a braking event;

means for determining brake condition and vehicle motion;

means for determining whether the deceleration value reaches a second deceleration threshold based on the brake condition and vehicle motion determination and the first deceleration threshold determination; and     means for applying threshold balancing when the second deceleration threshold is reached;

wherein applying threshold balancing comprises determining a front brake force and a rear brake force in response to the extended braking state and low deceleration, wherein the rear brake force is calculated using a weighted sum of the pedal displacement and master cylinder     pressure, and the front brake force is calculated using master cylinder pressure.

\* \* \* \* \*